US010936352B2

(12) United States Patent
Soman et al.

(10) Patent No.: US 10,936,352 B2
(45) Date of Patent: Mar. 2, 2021

(54) HIGH PERFORMANCE APPLICATION DELIVERY TO VDI DESKTOPS USING ATTACHABLE APPLICATION CONTAINERS

(71) Applicant: VMware, Inc., Palo Alto, CA (US)

(72) Inventors: Sisimon Soman, Sunnyvale, CA (US); Arun Passi, Palo Alto, CA (US); Parag Chakraborty, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 139 days.

(21) Appl. No.: 16/449,379

(22) Filed: Jun. 22, 2019

(65) Prior Publication Data

US 2020/0401428 A1 Dec. 24, 2020

(51) Int. Cl.
*G06F 9/455* (2018.01)
*G06F 3/06* (2006.01)
(Continued)

(52) U.S. Cl.
CPC ............ *G06F 9/4555* (2013.01); *G06F 3/064* (2013.01); *G06F 3/067* (2013.01); *G06F 3/0607* (2013.01); *G06F 9/30047* (2013.01); *G06F 9/45558* (2013.01); *G06F 12/0862* (2013.01); *G06F 2009/45579* (2013.01); *G06F 2009/45583* (2013.01); *G06F 2009/45595* (2013.01)

(58) Field of Classification Search
CPC .... G06F 9/4555; G06F 3/067; G06F 9/45558; G06F 12/0862; G06F 9/30047; G06F 3/064; G06F 3/0607; G06F 2009/45595; G06F 2009/45583; G06F 2009/45579
See application file for complete search history.

(56) References Cited

U.S. PATENT DOCUMENTS 8,370,819 B2 * 2/2013 Chakraborty ............. G06F 8/63
717/148
2011/0276963 A1 * 11/2011 Wu ...................... H04L 67/1097
718/1

(Continued)

OTHER PUBLICATIONS

"File Mappling"; https://docs.microsoft.com/en-us/windows/desktop/memory/file-mapping; May 30, 2018; Retrieved on Jun. 22, 2019.

(Continued)

*Primary Examiner* — Benjamin C Wu

(57) ABSTRACT

A system is described for high-performance delivery of applications via attachable application storage volumes (ASV), particularly in cloud-based VDI environments, by precaching application data that is determined by learning the application behavior. Data blocks for files that are likely to be used by the application are prefetched and cached by virtual machines before the application requests those blocks so that the relevant data is instantly available in memory when required without needing to wait for the data to be transmitted from the ASV. In order to efficiently prefetch content, the read pattern for application files and their corresponding blocks is inspected. This information is used during application delivery after a user logs onto the virtual machine to selectively prefetch those blocks from the ASVs. As a result, when the user launches those applications, the system avoids the performance penalty of reading those blocks from the ASV.

20 Claims, 6 Drawing Sheets

(51) Int. Cl.
   *G06F 9/30*   (2018.01)
   *G06F 12/0862* (2016.01)

(56) References Cited

U.S. PATENT DOCUMENTS

| | | | | |
|---|---|---|---|---|
| 2012/0030672 | A1* | 2/2012 | Zygmuntowicz | G06F 8/60 718/1 |
| 2013/0151805 | A1* | 6/2013 | Fontignie | G06F 3/0683 711/170 |
| 2013/0152084 | A1* | 6/2013 | Arcese | G06F 21/45 718/1 |
| 2014/0297780 | A1* | 10/2014 | Zhou | H04L 67/2847 709/216 |
| 2015/0128139 | A1* | 5/2015 | Suzuki | G06F 9/45558 718/1 |
| 2016/0055017 | A1* | 2/2016 | Beveridge | G06F 9/52 718/1 |
| 2016/0197986 | A1* | 7/2016 | Chambliss | H04L 67/2861 709/213 |
| 2016/0292001 | A1* | 10/2016 | Park | G06F 16/172 |
| 2016/0306743 | A1* | 10/2016 | Yoo | G06F 12/0862 |
| 2016/0371105 | A1* | 12/2016 | Sieffert | G06F 9/45558 |
| 2018/0213036 | A1* | 7/2018 | Vasetsky | H04L 41/0896 |

OTHER PUBLICATIONS

Raymong Chen; "How do FILE_FLAG_SEQUENTIAL_SCAN and FILE_FLAG_RANDOM_ACCESS affect how the operating system treats my file?"; https://blogs.msdn.microsoft.com/oldnewthing/20120120-00/?p=84931; Jan. 20, 2012; Retrieved on Jun. 22, 2019.

"FSCTL_MOVE_FILE IOCTL"; https://msdn.microsoft.com/en-us/library/windows/desktop/aa364577(v=vs.85).aspx; Dec. 4, 2018; Retrieved on Jun. 22, 2019.

"CreateFileMappingA function"; https://docs.microsoft.com/en-us/windows/desktop/api/winbase/nf-winbase-createfilemappinga; Dec. 4, 2018; Retrieved on Jun. 22, 2019.

Amiraj Dhawan, Shruti Bhave, Amrita Aurora, Vishwanathan Iyer; "Association Rule Based Flexible Machine Learning Module for Embedded System Platforms like Android"; (IJARAI) International Journal of Advanced Research in Artificial Intelligence, vol. 3, No. 1, 2014.

* cited by examiner

| $WF_1B_1$ | $WF_1B_2$ | $WF_1B_5$ | $WF_2B_1$ | $WF_2B_2$ | $WF_2B_{10}$ |
|---|---|---|---|---|---|
| $WF_9B_1$ | $WF_9B_2$ | $PF_5B_5$ | $PF_5B_7$ | $PF_5B_8$ | $PF_6B_{10}$ |
| $PF_6B_{11}$ | $PF_7B_2$ | $PF_7B_5$ | $EF_1B_1$ | $EF_1B_9$ | $EF_2B_3$ |
| $EF_2B_4$ | $EF_2B_5$ | $EF_2B_6$ | $EF_2B_8$ | $EF_5B_2$ | ……. |

FIG. 4A

| $\mathbf{WF_1B_1}$ | $WF_1B_2$ | $WF_1B_5$ | $\mathbf{WF_2B_1}$ | $WF_2B_2$ | $\mathbf{WF_2B_{10}}$ |
|---|---|---|---|---|---|
| $WF_9B_1$ | $\mathbf{WF_9B_2}$ | $\mathbf{PF_5B_5}$ | $PF_5B_7$ | $PF_5B_8$ | $\mathbf{PF_6B_{10}}$ |
| $PF_6B_{11}$ | $PF_7B_2$ | $\mathbf{PF_7B_5}$ | $EF_1B_1$ | $\mathbf{EF_1B_9}$ | $EF_2B_3$ |
| $EF_2B_4$ | $\mathbf{EF_2B_5}$ | $EF_2B_6$ | $EF_2B_8$ | $\mathbf{EF_5B_2}$ | ……. |

FIG. 4B

| $WF_1B_1$ | $WF_2B_1$ | $WF_2B_{10}$ | $WF_9B_2$ | $PF_5B_5$ | $PF_6B_{10}$ |
|---|---|---|---|---|---|
| $PF_7B_5$ | $EF_1B_9$ | $EF_2B_5$ | $EF_5B_2$ | $WF_1B_2$ | $WF_1B_5$ |
| $WF_2B_2$ | $WF_9B_1$ | $PF_5B_7$ | $PF_5B_8$ | $PF_6B_{11}$ | $PF_7B_2$ |
| $EF_1B_1$ | $EF_2B_3$ | $EF_2B_4$ | $EF_2B_6$ | $EF_2B_8$ | ……. |

FIG. 4C ated sequentially in order or access.

HIGH PERFORMANCE APPLICATION DELIVERY TO VDI DESKTOPS USING ATTACHABLE APPLICATION CONTAINERS

TECHNICAL FIELD

The present disclosure generally relates to virtual desktop infrastructure and more specifically to techniques for delivering applications to virtual desktops using attachable application containers.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

In order to satisfy individual user requirements, each virtual desktop must be provided with a set of applications that are usually customized for the user. One approach for addressing the application delivery requirements, suited particularly to the remote desktop space, utilizes application storage volumes (ASVs), which are centrally stored and managed containers, such as virtual disks, containing one or more applications. The ASVs can be mounted or attached to a virtual machine to deliver a contained application to the virtual machine. With this technology, the ASVs are maintained in a central storage location that is accessible by virtual machines (VMs). Applications delivered using ASVs can become available on or be removed from the VM in a near-instant manner and can look and feel (to a user accessing the application on the VM via a client device) natively installed, while requiring minimal administrator involvement. Administrators can update or replace applications in real time and remove any assigned application, either immediately, while the user is still logged in, or at a next login or reboot. Furthermore, the administrator can perform these operations on any number of VMs simultaneously by simply indicating, via a management interface, which VMs or groups of VMs the operations should be performed on.

However, application delivery using ASVs in remote virtual desktop environments still poses numerous challenges. For example, in cases where data access speeds on ASVs is limited, such as where the ASVs are on slower storage or are located remotely from the VMs and access is over a network connection, latencies in data access in the ASVs can result in significantly diminished performance of the applications delivered on the ASVs. Such issues may arise, for example, in cloud-based VDI deployments when applications are delivered to the VMs using ASVs that reside on a network share, which are remotely located from the device hosting the virtual desktop. Here, application performance can suffer due to the extra level of indirection from the network share.

What is needed is a more efficient way for application delivery using ASVs in the remote desktop infrastructure.

BRIEF DESCRIPTION OF THE DRAWINGS

FIG. 4A illustrates an example of a disk block layout of applications captured on an ASV.

FIG. 4B illustrates an example of blocks accessed during launch of the applications captured on the ASV.

FIG. 4C illustrates an example of an ASV disk block layout with the blocks rearranged sequentially in order or access.

DETAILED DESCRIPTION

Figure 1:
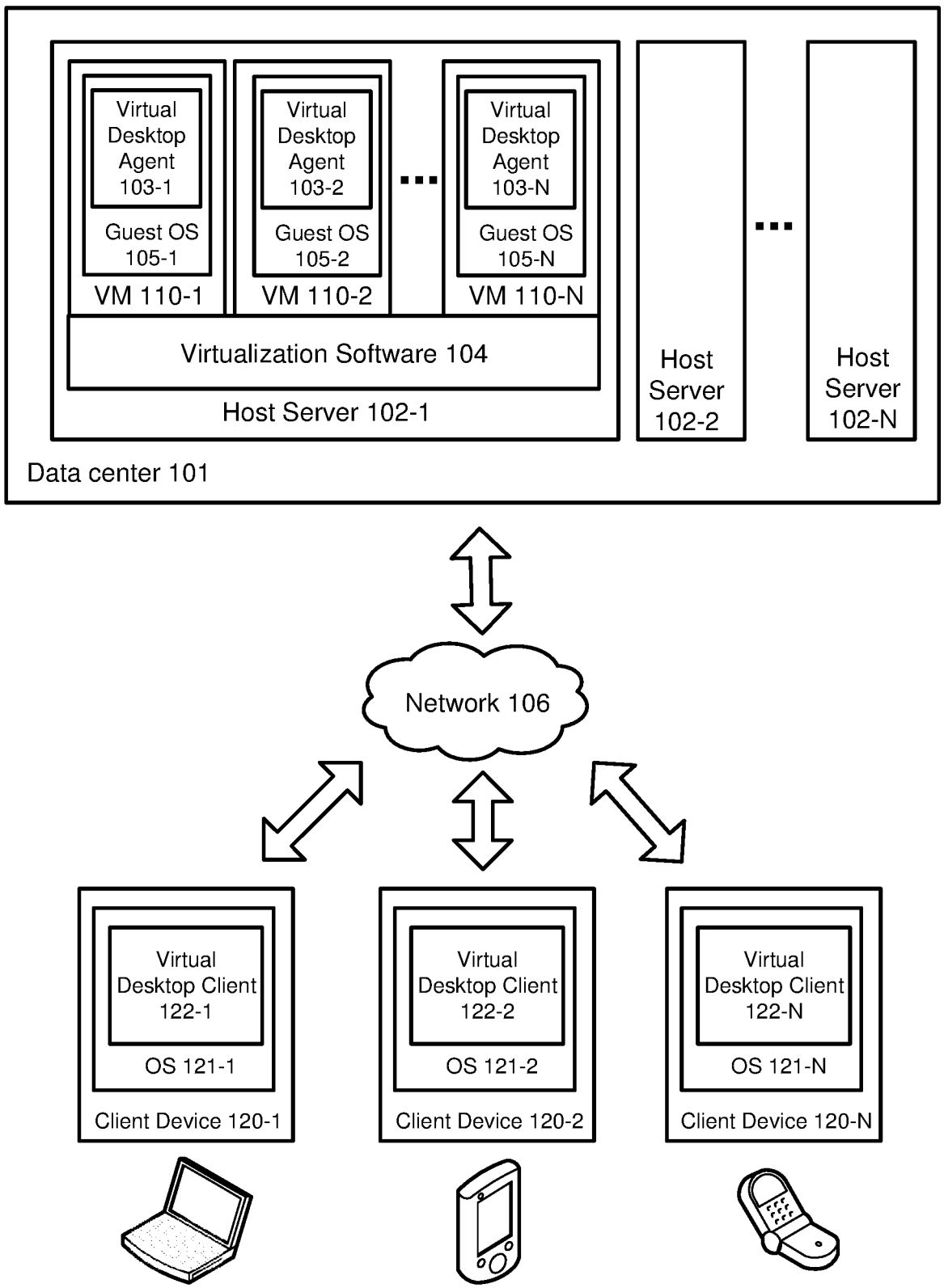
FIG. 1 illustrates an example of a virtual desktop environment, in accordance with various embodiments.

Systems and methods in accordance with various embodiments of the present disclosure overcome at least some of the above-mentioned shortcomings and deficiencies by providing more efficient ways to deliver applications using ASVs in the remote desktop environment. In particular, embodiments described herein leverage a mechanism for pre-fetching blocks for applications contained in ASVs after a user logs onto a virtual machine, so that when the user launches those applications, he or she can avoid the performance penalty of reading those blocks from the ASV.

Generally, application virtualization using ASVs is performed in two phases. In the first phase, one application or a set of applications that are to be delivered together are captured in individual containers or volumes referred to herein as "Application Storage Volumes" or "ASVs". In the second phase, those containers are attached to the virtual machines (or physical devices) on which they are required in order to deliver the application to the VMs. AppVolumes, available from VMware, Inc., is one example of such an application virtualization solution using ASVs.

In various embodiments, applications are captured in ASVs using a file system filter driver, which can redirect file and registry open/create requests from one volume to another. The capture process begins by installing the application or applications on a staging machine, which may be a virtual machine. During capture, a writable virtual disk is attached to the staging machine and all file/registry creation and modifications made during the application installation process are redirected to that disk, such that when an application is installed, all its content gets captured on that virtual disk. After installation is complete, the virtual disk can be used to produce an ASV that is attachable on other machines to deliver the application or applications that were captured on it.

The produced ASV can then be assigned (e.g. by an administrator) to a particular virtual machine to deliver the applications in the ASV to the virtual machine. During application delivery, the corresponding ASV is attached to the virtual machine in read-only mode (e.g. the virtual disk containing the application content is mounted on the VM). A file-system filter driver merges the file and registry information from the ASV with the operating system of the virtual machine at runtime and generates a dynamic unified view for all the applications installed on the virtual machine.

With the ASV technology, administrators can quickly and easily deliver and remove applications on endpoints without the hassles of running installers and other burdens of traditional application management systems. However, this approach can suffer from performance problems, particularly when data access speeds on ASVs by virtual machines are limited, due to reading data from the ASVs over the network. Such issues can be exacerbated when ASVs reside in slower storage and in locations that are remote to the virtual machines or in locations that must otherwise be accessed by the virtual machines over slower connections.

One scenario where applications delivered via ASVs can exhibit significant performance limitations is within cloud-based VDI deployments, where the virtual machines are hosted in a datacenter (e.g., a datacenter of a third-party service provider) and need to access ASVs residing on a network share. An example of a cloud-based service that can be used to deploy a virtual desktop infrastructure is Azure, available from Microsoft Corporation. In certain on-premises VDI deployments, the ASVs can reside locally with the virtual machines (e.g., ASVs can be locally mounted on the hypervisor) and provide rapid data access for the VM. However, many cloud-based deployments do not support locally attached ASVs and therefore must rely on ASVs that are stored on a network share. Read operations performed on ASVs stored on network shares are much slower than on locally attached ASVs and this can significantly affect the application launch and runtime performance.

For example, in one implementation of an on-premises VDI deployment that supports locally attached application storage volumes, applications can be delivered to the virtual machines by means of ASVs that are attached to the virtual machines in the form of a VMDK (Virtual Machine Disk). The ASVs can be locally attached to the hypervisor in read-only mode and be shared by multiple virtual machines on the hypervisor. The hypervisor can cache frequently used blocks or pages in memory for read-only sharing by the multiple virtual machines hosted by the hypervisor. However, in the case of cloud-based deployments, such as Microsoft Azure, which do not support a VMDK or an equivalent local disk to be dynamically attached to a given virtual machine and where there is no control of the cloud-based hypervisor, application virtualization solutions may need to use VHDs (Virtual Hard Disk) for containing ASVs. In this case, the ASVs are stored on a network share and get mounted to individual virtual machines from there. This adds an extra layer of file and disk input/output (I/O) over the network protocol, which can create a bottleneck for achieving good runtime performance for the application. The detrimental effects on performance can be most pronounced the first time an application is launched from the ASV. When launching the application for the first time, all necessary application file blocks have to be pulled from the ASVs in storage to the page frames (RAM pages) of the VM before the application can execute. This operation can be costly to performance in cloud-based VDI environments due to the time consumed transmitting file blocks from the ASVs, which may reside on a network share.

The embodiments described herein provide systems and methods for high-performance delivery of applications via ASVs, particularly in cloud-based VDI environments that do not support locally attached ASVs, by prefetching certain application data that is determined by learning the application behavior during the ASV capture process. Data blocks for files that are likely to be used by the application during launch/runtime are prefetched and cached by virtual machines before the application requests those blocks so that the relevant data is instantly available in memory when required without needing to wait for the data to be accessed on the ASV and transmitted over the network. In order to efficiently prefetch content, the read pattern for application files and their corresponding blocks is inspected, which can take place during the process of capturing the applications on the ASV. More specifically, during the capture process, once the application installation is complete, a hidden Windows session is created and the application is launched within the hidden session, so that the user interface operations are not visible to the user. A filter driver monitors the files associated with the application in order to learn the order in which the file blocks are read during the application launch. The information learned from observing the read pattern is recorded in a manifest that can be stored alongside the application in the ASV as part of the capture process. This information in the manifest identifies the data blocks that are likely to be used during the application launch/runtime and it will be used during application delivery after a user logs onto the virtual machine to selectively prefetch those blocks from the ASVs. As a result, when the user launches those applications on the VM, the system avoids the performance penalty of reading those blocks from the ASV, which may reside on a network share with slower than ideal access speeds.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
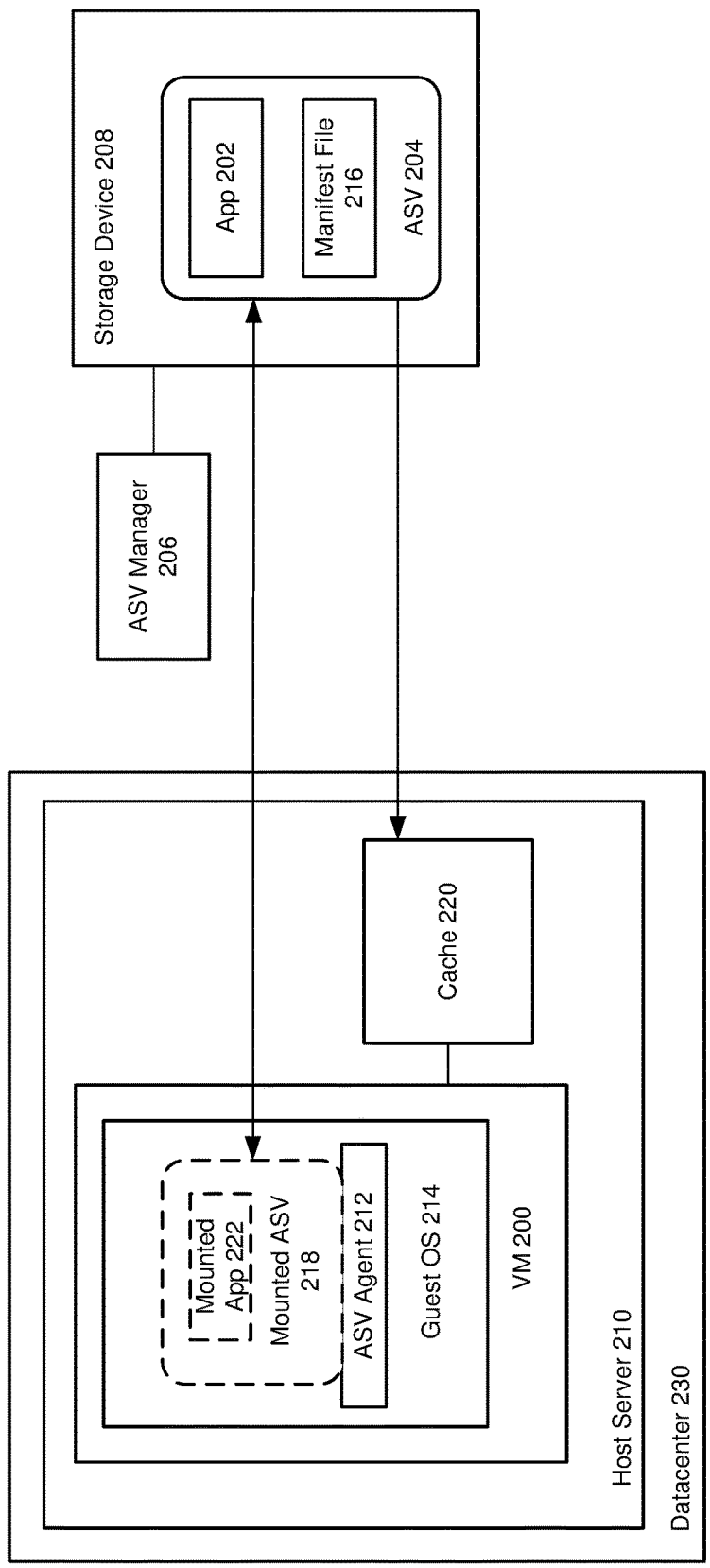
FIG. 2 illustrates an example architecture of a system for high performance application delivery using application storage volumes in a virtual desktop environment, in accordance with various embodiments.

FIG. 2 illustrates an example architecture of a system for high performance application delivery using application storage volumes in a virtual desktop environment, in accordance with various embodiments. The example of FIG. 2 illustrates the deployment of an application 202 contained in an ASV 204 to a virtual machine 200. For the sake of simplicity, a single application 202 is illustrated in the ASV 204. However, in a real-world scenario, the ASV 204 may contain numerous other applications in addition to application 202. The ASV 204 resides on a storage device 208, which may for example be a physical hard disk, a storage array, or an SSD (Solid-State Drive). The storage device 208, may be located on a server (not pictured), which may be a different server than the host server 210, or a network share. The ASV 204 in the storage 208 may be accessible to the VM 200 over a network, for example, such as a LAN (local area network) or a WAN.

The VM 200 runs on a host server 210 in a datacenter 230 and provides a virtual desktop that is presented by a guest OS 214 to a user of a remote client device connected to the VM 200 over a network, which is not pictured for the sake of being concise. The host server 210 further includes a cache 220 to be used by the virtual machine 200, which can be any rapidly accessible storage media (e.g. RAM, SSD, etc.) on the host server 210 that is local to the virtual machine 200 and separate from main storage. In various embodiments, the cache 220 may be managed by the hypervisor and shared by multiple VMs including VM 200.

While only one VM 200 is illustrated in this example, a real-world implementation would include multiple VMs hosted on the server 210, as in the example of FIG. 1. The storage device 208 would also normally contain numerous ASVs, although only the one ASV 204 is illustrated, and any of the ASVs could be mounted and shared by any number of VMs hosted on the host server 210. For example, the ASV 204 can be mounted in read-only mode on multiple VMs, delivering to each VM the contained application 202. In embodiments where the ASV 204 contains multiple applications, all contained applications can be delivered to a VM by attaching the ASV 204.

The datacenter 230 may be an on-premises datacenter of an enterprise or a cloud-based datacenter, such as a datacenter used for third-party VDI products such as Microsoft Azure. The ASV 204 is in a location that is accessible to VMs on the host server 210 (e.g., VM 200). For example, the ASV 204 may be on a network share that is on-premises, or on another server. As will be appreciated by those skilled in the art, the configuration of the components in FIG. 2 is given by way of example and other configurations are possible without straying from the spirit of the invention. However, as mentioned previously, the invention may be particularly advantageous in configurations where data transfer between the ASVs (e.g., ASV 204) and the virtual machines (e.g., VM 200) is slow, such as where the VMs (e.g., VM 200) are hosted on the cloud (e.g., with a product such as Microsoft Azure) and the ASVs (e.g., ASV 204) reside on the enterprise's network share or on a network share at the cloud VM service (e.g., network share at Azure itself). As used throughout this disclosure, a network share can be any computer storage resource capable of being accessed by the VMs over a network connection, such as a LAN (local area network), WAN (wide area network), or an enterprise intranet.

An application storage volume agent 212 executes in the guest OS 214 of the VM 200. The ASV agent 212 performs various functions for enabling application delivery on the VM 200 from the ASVs (e.g., 204).

In various embodiments, an administrator can manage ASVs (e.g., 204) via an ASV manager 206. For example, the administrator may be able to access the ASV manager 206 via an interface and perform operations on VMs (e.g., 200) such as assigning ASVs or removing assigned ASVs (e.g., 204) from endpoints. In various embodiments, the ASV manager 206 may reside on an enterprise server or be cloud-based (not pictured for the sake of being concise).

For example, to deploy an application (e.g., 202) to the VM 200, an administrator can access the system (e.g., via an interface to the ASV manager 206) and view a library of available ASVs (e.g., 204) containing various applications (e.g., 202). The administrator can then assign an ASV (e.g., 204) to one or more selected VMs (e.g., 200) in order to deploy the applications (e.g., 202) in the ASV (e.g., 204) to the selected VMs (e.g., 200).

In various embodiments, the ASV 204 may be a read-only virtual disk, such as a VHD or VMDK. The ASV 204 may contain all application 202 components necessary for the application 202 to be executed from the ASV 204. The ASV 204 may be initially created by an administrator through the ASV manager 206 by setting up a designated "capture" or "staging" machine, such as a clean VM, installing the application 202 on the capture machine, and capturing the application 202 components into the ASV 204 during the installation. The same process can be repeated with other applications to capture numerous applications on one ASV 204. The process of application capture 202 can be automated. As described above, this may be performed using a file system filter driver, which can redirect file and registry open/create requests from one volume to another. During capture, a writable virtual disk is attached to (mounted on) the staging machine and all file/registry creation and modifications made during the application installation process are intercepted by the filter driver and redirected to the writable virtual disk, such that when the application 202 is completely installed on the staging machine, all of the application content is captured on that disk.

After installation is complete, the virtual disk can be used to produce the ASV 204 containing the contents of the application 202 such that the ASV 204 is attachable on other machines to deliver the application 202 (or applications) that was captured on it. Other methods may also be used to produce the ASV 204 and this invention is not limited to any particular way of capturing applications and producing ASVs. For example the ASV 204 may be created based on a delta snapshot that contains the application 202 components by capturing a snapshot of a clean staging VM before installing the application 202, then capturing a snapshot of the staging VM after the application 202 has been installed on it, and producing the delta snapshot based on the differences between the two snapshots. To place multiple applications onto an ASV, the same process can be used to capture each of the multiple applications on the ASV.

The ASV 204 contains a manifest file 216 that was created as part of the application capture process. The manifest file 216 indicates what content on the ASV 204 should be prefetched by a VM (e.g., 200) after the ASV 204 is mounted on the VM. In various embodiments, the manifest file 216 can provide instructions, to be read by the ASV agent 212, to bring certain content from the ASV 204 into the cache 220 of the VM 200. For example, the ASV agent 212 can read the manifest 216 and send a request to the ASV 204, via a server or network share where the ASV 204 is stored, for the content identified in the manifest 216. Creation of the manifest file 216 and its role in the process will be described in further detail below.

In various embodiments, the ASV 204 is assigned to the VM 200 to make the application 202 (or applications, if the ASV 204 contains multiple applications) in the ASV 204 available in the VM 200. For example, the ASV 204 can be assigned to a particular user (e.g., by an administrator) and when the user logs into the VM 200 to start a desktop session, the ASV 204 can be mounted on the VM 200 to make the application available 202 to the user in the desktop session. The ASV agent 212 operating on the VM 200 can automatically attach or mount the virtual disk of the ASV 204 to the VM 200 in read-only mode once the user logs into the VM. A file-system filter driver in the ASV agent 212 merges the file and registry information from the ASV 204 with the operating system 214 of the virtual machine 200 at runtime and generates a dynamic unified view for all the applications installed on the virtual machine 200. This way, the application 202 can be executed in the VM 200 from the ASV 204, such that the application 202 can remain in the ASV 204 on the storage device 208 but a user accessing the VM will be able to launch and use the application in the VM 200.

The ASV 204 may appear in the VM 200 as a mounted drive 218. Alternatively, the ASV 204 may not appear as a separate mounted drive by hiding any assigned drive letter (or not mapping a separate drive letter at all) to the ASV 204. The mounted ASV 218 is illustrated with dashes to indicate that the ASV 204 merely appears inside the VM 218 while its physical location remains in the storage device 208. Similarly, the application 202 in the ASV 204 becomes available in the VM 200 as a mounted application 222 although it may function and appear to a user identical to how it would be if it was fully installed directly in the VM 200.

The agent 212 is software applied to a virtual machine to virtualize any attached application storage volume into the operating system to make the application on that volume appear as though the application was natively installed on the VM. Hence, in various embodiments, when a mounted application 222 is executed on a VM 200, the execution takes place from the application 202 on the ASV 204 in the storage device 208. The agent 212 can operate as a filter driver and intercept calls to the mounted application 218 from the OS 214 and direct them to the virtual disk 204. Returns from the application 202 on the virtual disk 204 are likewise routed back to the OS 214 by the agent 212. The two-way arrows leading between the ASV 204 on the storage device 208 and the ASV 218 in the VM 200 in the example of FIG. 2 are intended to illustrate this two-way flow of data between the VM 200 and the storage device 208 that occurs when the mounted application 222 is executing from the ASV 204 on the storage device 208.

In various embodiments, when the agent 212 mounts the virtual disk 218, it can also configure the remote desktop so that the application 202 contained in the ASV 204 becomes available in the desktop and appears and performs (to a user accessing the application on the VM 200 via a remote client device) natively installed. For example, the agent 212 may modify the registry entries on the operating system 214 of the VM 200 to make the application executable directly from the virtual disk 204.

As illustrated in the example of FIG. 2, in this case the ASV 204 has been assigned to the VM 200. The assignment of the disk 204 may be performed by pointing or directing the VM 200 to the location of the virtual disk 204 on the storage device 208, without necessarily moving the virtual disk 204 to a different physical location or making copies of the virtual disk 204. In this way, a single ASV 204 may be assigned to any number of VMs quickly and efficiently.

In various embodiments, the ASV 204 is read-only, which can facilitate assigning it to multiple VMs simultaneously. Accordingly, application 202 data that is produced by a VM 200 during execution of the application 202 is written to a different location, such as a write disk. Such write disks can be created for each VM and each write disk may contain the changes caused during execution of the application on its respective VM.

As will be appreciated by those skilled in the art, while the example of FIG. 2 illustrates a single ASV 204 with a single application 202, a typical enterprise environment would include a library of several ASVs, each containing one or a number of applications. A typical environment would also contain hundreds or thousands of VMs and each ASV may also be assigned to any number of VMs. An administrator may be able to view a list of all the available applications and ASVs via an interface on the ASV manager 206 and assign the applications and ASVs to any VMs on the network via the interface.

In various embodiments, after the user logs into his or her virtual desktop on the VM 200, the ASV agent 212 mounts the ASV 204 assigned to the user and, after mounting the ASV 214, the ASV agent 212 brings certain content of the application 202 that is deemed to be necessary to launch the application into the VM cache 220 (as indicated by the arrow from the ASV 204 to the Cache 220). For example, the ASV agent 212 can retrieve from the ASV 204 and place in the cache 220 data blocks that are used by the application during launch. The data blocks of an application (e.g., 202) that are used to pre-cache the application in this way may be referred to herein as "pre-caching data blocks" or "pre-cache data blocks".

The pre-fetching of content can be performed automatically after the user logs into the VM, even before the user launches the application 202 or makes other input on the VM 200. Once the user launches the application 202, the pre-cached content can be obtained locally from the cache 220 when it is requested by the application 202. Hence, the performance detriment of fetching and accessing content on the ASV 204 on the storage device 208 is avoided. If the application 202 requests content that is not available in the cache 220, the ASV agent 212 can fetch or access that content on the ASV 204 on the storage device 208.

In various embodiments, the ASV agent 212 can determine what content (e.g., what file blocks) of the application 202 to pre-fetch from the ASV 204 based on the manifest file 216. If the ASV 204 contains multiple applications, the manifest file 216 can indicate what content (if any) of each of the multiple applications to pre-fetch, as well as the order in which the content should be retrieved, i.e., which applications should be pre-cached first, second, etc. In an embodiment, a separate manifest can be contained for each application that is designated for pre-caching in the ASV 204. As will be discussed in more detail below, the blocks that are pre-cached can also be rearranged sequentially in the ASV 204 to make the process more efficient.

Figure 3:
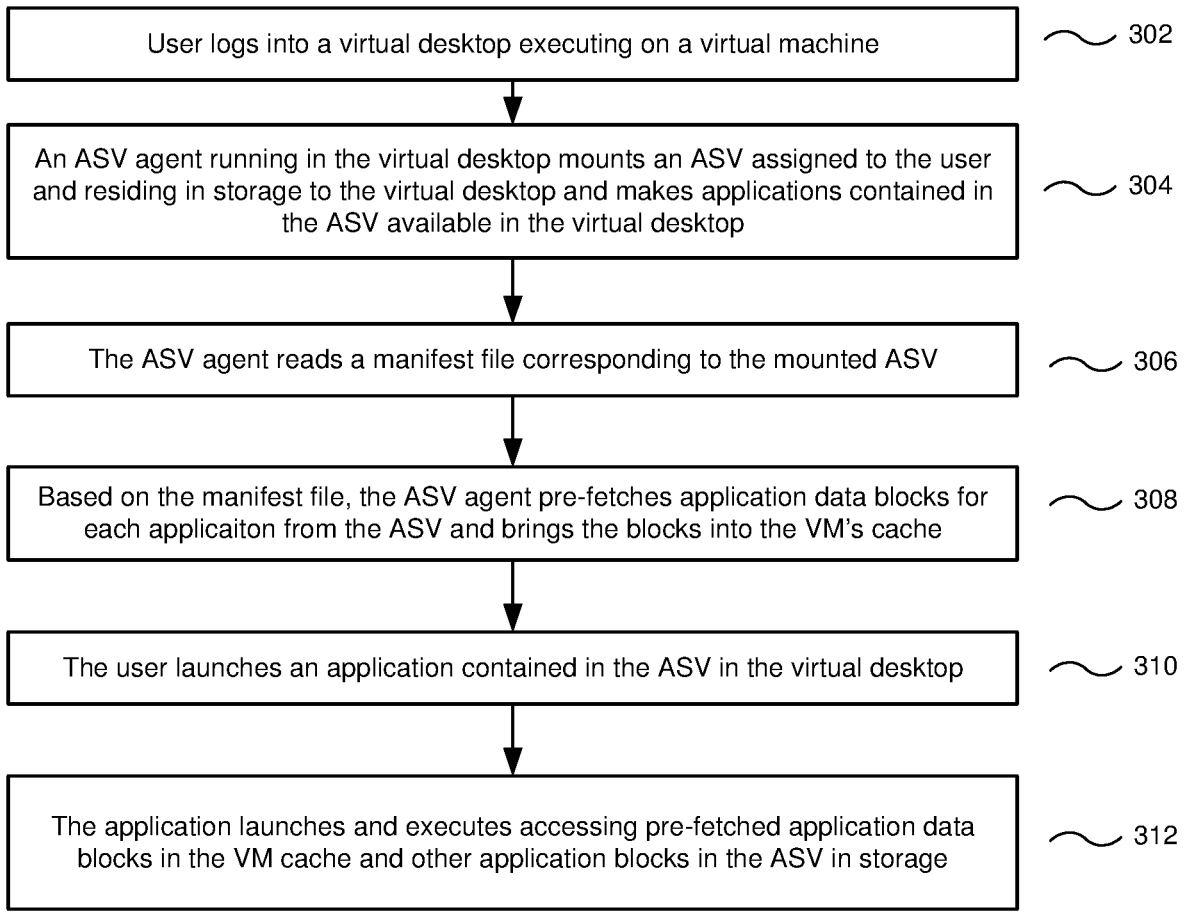
FIG. 3 illustrates an example process flow for high performance application delivery using application storage volumes in a virtual desktop environment, in accordance with various embodiments.

FIG. 3 illustrates an example process flow for high performance application delivery using application storage volumes in a virtual desktop environment, in accordance with various embodiments. The process begins in operation 302, where a user logs into a virtual desktop executing on a virtual machine. The virtual desktop may be part of a cloud-based VDI of an enterprise and the user may log in and access the virtual desktop via the user's client device. In operation 304, an ASV agent running in the virtual desktop mounts an ASV assigned to the user and residing in storage to the virtual desktop and makes applications contained in the ASV available in the virtual desktop. For example, the ASV may be assigned to the user by an administrator to deliver apps in the ASV to the user's virtual desktop. The ASV may be a shared resource and reside on a network in the enterprise, where it can be accessed in read-only mode by users' virtual machines. In operation 306, the ASV agent reads a manifest file corresponding to the mounted ASV. The manifest file can be located in the ASV and contain instructions for pre-fetching data blocks for each of the applications in the ASV. In operation 308, based on the manifest file, the ASV agent pre-fetches application data blocks for each application from the ASV and brings the blocks into the VM's cache. In operation 310, the user launches an application contained in the ASV in the virtual desktop. In operation 312, the application launches and executes in the virtual desktop accessing pre-fetched application data blocks in the VM cache and other application blocks, which are not available in cache, in the ASV in storage.

Various techniques can be used to determine content of an application contained in an ASV that should be pre-cached on the VM for optimal performance. Once the pre-caching content is determined, the locations of the corresponding blocks in the ASV can be recorded in the manifest file, and the ASV agent can retrieve and cache the blocks in the VM based on the manifest file after the ASV is mounted and before the application is executed. Ideally, at least the data blocks that are used by the application during launch should be pre-cached. In various embodiments, the location of these data blocks can be identified and recorded in the manifest file. Subsequently, when the ASV is mounted on a VM, the ASV agent operating on the VM can read the manifest and bring those blocks into the VM cache so they can be accessed locally by the VM during application launch.

In various embodiments, the file blocks to be pre-cached for a particular application can be determined during the capture process by launching the application from the ASV on a staging machine, which may be a virtual machine. For example, after completing the process of capturing one or more applications in an ASV on a virtual machine, as described above, the system can take a next step of going through the new applications and determining what content should be pre-cached for each application when it is delivered to a VM. To do this, after the application capture process is complete, the system can create a new hidden session (e.g., a Windows session) on the staging machine and launch the captured applications in that session from the ASV, one by one. The user interface associated with those applications may be made invisible to the user. A file system filter driver monitors the files associated with those applications and records which file blocks are read (e.g., it can record the location of the file blocks).

Each application in the ASV can be launched and the filesystem filter driver can identify the files (e.g., .exe and .dll files) it read as part of the launch and the block details for those files. For example, during launch an application may read some blocks from a .exe file (e.g., blocks 1 to 25, 50 to 75, etc.) and another 50 blocks from five .dll files. These accesses can be recorded by the filesystem filter driver. The system can also record other information, such as the order in which corresponding file blocks are read (or the time they are read) and the frequency with which they are read, which can aid in further optimizing the configuration and arrangement of the pre-cache data on the ASV. The system can continue monitoring the file reads in this fashion until the application launch is deemed completed, for example, until a predetermined threshold of time passes without the application making any more reads. Subsequently, the locations of the identified blocks (or other identifying information) on the ASV can be stored in the manifest file so that they can be retrieved and pre-cached by a VM after mounting the ASV containing the application. Consequently, when the application is launched from the ASV in the VM, the pre-cached data blocks can be retrieved from local memory in the VM instead of going to the ASV, which may reside in slower or less accessible storage.

Further techniques can be implemented to optimize the ASV pre-caching mechanism. For example, when an application is launched from an ASV, the block read pattern for the files being read during the course of the launch of the application can be random and of small size (e.g., less than a megabyte), as opposed to being sequentially organized. This is not optimal for block caching and storage systems where optimizations are based on reading ahead. Particularly where there are numerous applications that are shared between several users, optimal usage of block caching can be critical for achieving good performance. In various embodiments, to improve the efficiency and speed of application delivery using ASVs, the layout of the blocks on the ASV can be arranged in such a way that blocks that are required for application launch will be arranged contiguously, that is, in the order that the application requests the blocks during launch.

In the example provided above, for instance, the ASV can be packed in a way so that the identified blocks stay together in the order of access. That is, the blocks 1 to 25 and 50 to 75 of the .exe file, and the 50 blocks from the other five .dll files that were identified as being accessed by the application during launch in the example can be placed together in the order of access on the ASV.

Thus, after identifying the blocks used by an application or applications during launch (as described above), the location of the blocks can be rearranged in the ASV so that the blocks are placed sequentially in the order in which they were read by the application during the recorded launch. In other words, the blocks can be stored contiguously in the ASV. This can aid in efficient pre-caching of virtual machines receiving the ASV because, for example, the caching system can perform aggressive read-ahead due to the sequential arrangement of blocks. Such rearrangement of blocks can also ensure that when a given application is launched, it results in sequential reads on the storage medium, which is generally much faster than reading from random offsets.

The process for creating an ASV with such sequentially arranged pre-cache data can begin by launching the applications in the ASV in a staging environment and determining what blocks are pulled by the applications in the ASV during launch, as described above. After determining which blocks were accessed by the applications and in what order, the system can rearrange these blocks in the ASV in the order they were read so that they are stored contiguously in the ASV. In the Windows operating system environment, for this purpose the system can leverage the FSCTL_MOVE_FILE IOCTL for moving the blocks, as this approach is natively supported by the NTFS (New Technology File System) filesystem. The FSCTL_MOVE_FILE control code relocates one or more virtual clusters of a file from one logical cluster to another within the same volume. The FSCTL_MOVE_FILE IOCTL is used by disk defragmentation tools to move blocks around on a volume and it can be leveraged to arrange the blocks needed for application launch together in the ASV.

After the pre-cache data blocks are identified and arranged sequentially on the ASV, the system can create an application manifest for each application (or, in an embodiment, a single manifest for all applications on the ASV), which will store information or instructions for locating the pre-cache blocks of the corresponding application on the ASV. This application manifest will be stored alongside the application in the ASV.

FIG. 4A illustrates an example of a disk block layout of applications captured on an ASV. In this example, the ASV contains three applications: application W (a word processing application), application P (a presentation application), and application E (a finance and accounting application). After the applications are captured on the ASV, but before any rearranging is performed, the application disk block layout on the ASV may appear as in the example of FIG. 4A, where $WF_xB_y$ is the block Y of file X for application W, similarly $EF_xB_y$ represents block Y of file X for Application E. Actual application disk layout could be different, and the below diagram is for demonstration purposes only. After the applications are captured, they can be launched and monitored (e.g., on a staging machine as described above) to determine which blocks are requested during the launch of each application.

FIG. 4B illustrates an example of blocks accessed during launch of the applications captured on the ASV. The blocks highlighted in bold in the example diagram of FIG. 4B represent the blocks that were accessed during launch of the applications in this example. The system may identify these blocks as the blocks that should be pre-cached on a VM where the ASV is mounted for more efficient launching of the applications. Accordingly, the system can produce a manifest identifying the highlighted blocks, so that an ASV agent mounting the ASV is able to identify and bring these blocks into the VM's cache upon mounting the ASV, based on the manifest. However, to further optimize the system, the blocks used for launch (the highlighted blocks in FIG. 4B) could also be rearranged sequentially.

FIG. 4C illustrates an example of an ASV disk block layout with the blocks rearranged sequentially in order or access. As illustrated, the blocks that were detected being read during launch of the applications (the highlighted blocks) have now been arranged sequentially for each application. Hence, the blocks for application W are placed contiguously in the order in which they were accessed during launch, as are the blocks for applications P and E. This way, when these blocks are retrieved to be pre-cached, the system does no have to jump around, as it would with the randomized locations of blocks as in the example of FIG. 4B. Instead, the blocks for each application can be read sequentially and, because sequential data is being requested, aggressive read ahead can be implemented by the caching system to speed up the pre-caching process. As above, the system can produce a manifest identifying the highlighted blocks, so that an ASV agent mounting the ASV can send a request for the data in the manifest to the ASV and bring these blocks into the VM's cache upon mounting the ASV. As illustrated, other blocks in the ASV (i.e., non-highlighted blocks that were not accessed during launch) can also be arranged in sequential or contiguous order to improve the efficiency of data reads from the ASV in those locations.

When several applications are included in an ASV, the system can also specify the order in which the applications are pre-cached; i.e., which application on the ASV is pre-cached first, second, etc. In an embodiment, the manifest in the ASV can specify this order (e.g., the same manifest identifying the blocks to pre-cache for each application). The order can be determined and inputted by an administrator (e.g., the system can create the manifest specifying the order based on the administrator's input). In other embodiments, the system can determine the order automatically (e.g., using machine learning) based on observed application usage patterns of multiple users, and it can set the order of application pre-caching (e.g., via the manifest) based on its determinations.

For example, the system can observe user behavior on several machines (e.g., virtual machines in the VDI) and determine or predict the most likely order in which the applications in the ASV will be launched by a particular user. The system can learn user application launch behavior using an algorithm such as the Association Rule machine learning algorithm. For example, if a user to whose virtual desktop an ASV is being delivered belongs to a certain group or department (e.g., accounting, engineering, etc.), the system can predict the applications which are most probable to be launched by the user based on the application usage patterns of other users in the same group/department. Also, the system can leverage such algorithms to predict the applications that are most probable to be launched by the user based on the history of the user's own usage of the applications (e.g., based on the order in which the user has launched applications in the past).

In an embodiment, the system can start with an administrator-configured launch policy specifying the order of application pre-caching in an ASV, then the system can observe the behavior of the user over time and change the order of application pre-caching by learning (using a machine learning algorithm) from the observed user behavior (e.g., based on the actual order in which the user launches the applications in the ASV over time).

As mentioned, the ASV agent can read the application manifest from the ASVs and prefetch the corresponding data blocks. In various embodiments, instead of simply reading and transferring those blocks from the ASV to the cache, techniques can be used that leverage the existing caching system in the VM (which may be part of the VM guest OS) to pre-cache the data. Namely, because caching systems are designed to efficiently transfer the data to cache using techniques like aggressive read-ahead, it could be advantageous to employ these systems for pre-caching data before the application is actually executed. This can be performed, for example, by requesting (by the ASV agent) the caching system to access or retrieve the blocks indicated in the manifest. The caching system will first check the cache for the requested blocks. When the caching system is unable to locate the blocks in the cache, it will fetch the corresponding blocks from the ASV and bring them into the VM's cache, thereby precaching the application before it is actually launched.

For example, in the Windows operating system, a technique can be used to let the Windows Memory Manager pre-cache the application data blocks. When the user logs into the desktop, the ASV agent can create a memory map for the application files (e.g., .exe and .dll files) in the manifest (with execute and read access for the application). After creating the memory map for a file (e.g., a .exe file), the system can check to see which blocks of that file need to be pre-cached (based on the manifest). For example, if blocks number 100 and 101 are indicated for pre-caching, then the system can read the first byte of blocks 100 and 101. The Windows Memory Manager will encounter a page fault and bring the entire blocks 100 and 101 into memory. This way, all the blocks designated in the manifest can be pre-fetched and cached at the VM. Later, when the application is launched by the user, the Windows Memory Manager will not encounter a page fault for these blocks since they will already be present in memory. Further, because those blocks were arranged to be contiguous during application capture, it results in sequential read from the storage medium.

Figure 5:
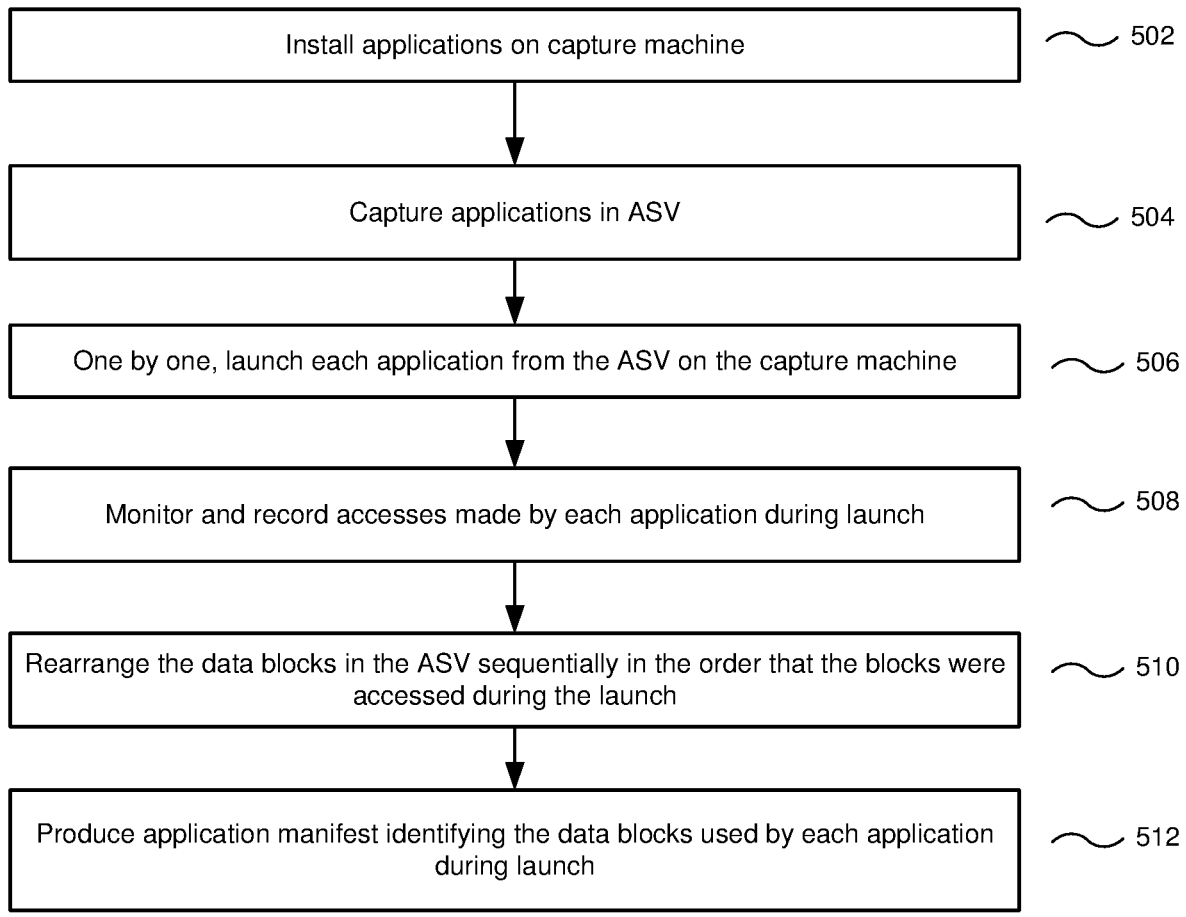
FIG. 5 illustrates an example process flow for capturing applications in an ASV and rearranging the block sequence for efficient pre-caching, in accordance with various embodiments.

FIG. 5 illustrates an example process flow for capturing applications in an ASV and rearranging the block sequence for efficient pre-caching, in accordance with various embodiments. In operation 502, the applications are installed on a capture machine, which may be a virtual machine. In operation 504, the installed applications are captured in an ASV. This can be performed by attaching a writable disk to the capture machine and redirecting all file/registry creation and modifications to that disk, such that when an application is installed, all its content gets captured on that disk. In operation 506, each application is launched from the ASV on the capture machine, one by one. In operation 508, accesses made by each application during launch are monitored and recorded. In operation 510, the data blocks in the ASV are rearranged sequentially in the order that the blocks were accessed during the launch. In operation 512, an application manifest identifying the data blocks (e.g., identifying the location of the blocks on the ASV) used by each application during launch is produced. The application manifest is then stored in the ASV along with the application.

In various embodiments, the system can be further configured to preserve application pre-cached pages and data when available memory is low, e.g., when the cache gets filled up. For example, when the system detects that available cache is running low, it can move application pre-cached pages from the cache to secondary storage. The secondary storage can be local storage on the virtual machine, such as SSD-based local storage at the hypervisor. Because the secondary storage is still local, accessing the pre-cached pages there can offer significant advantages over accessing the content back on the ASV, particularly when the ASV is on remote storage.

Thus, when the system detects that cache is low, or that an application's pre-cached blocks are to be evicted from cache, the system can move those blocks to such secondary storage. When the application is launched by the user, the pre-cached blocks can be accessed by the application in the secondary storage instead of in cache—which may still be significantly more efficient than accessing them on the ASV over the network. In an embodiment, existing functionality of operating systems can be leveraged to preserve application pre-cached pages and data when available memory is low in this way.

For example, in the Windows OS, the Windows Virtual Memory Manager moves less-frequently used pages into a paging file in secondary storage to free up memory when the system is under low memory conditions. The system can be configured to store these page files at secondary local storage at the hypervisor, such as an SSD-based local storage at the hypervisor. If the desktop has such a local page file, it will not need to close the mapped executable files after priming (i.e., it will not have to evict the pre-cached blocks). Instead, when the system is under memory pressure, the Windows Virtual Memory Manager can move the application pre-cached pages/blocks to the local page file (e.g., on the SSD at the hypervisor). Then, when the user launches the application, the application can read those pages from the page file instead of the ASV, thus skipping network overhead if the ASV is network-based.

When virtual desktops are not equipped with such local SSD-based page file storage, the system can be configured so that it closes the memory mapping for the application blocks, but the memory manager does not immediately free those block pages; instead, it moves them to a standby list. The memory manager will only free-up the prefetched blocks from the standby list when the system is under low-memory conditions.

In various embodiments, the techniques descried herein can be utilized for delivering applications in ASVs to physical computing devices. In the physical computing device scenario, the ASV can be mounted on the physical computing device in the same way that it is mounted on a virtual desktop, as described above. The ASV agent, in this case, runs in the operating system of the physical device and performs the functions of attaching the ASV in the device OS. Because the ASV itself may be in a remote location from the physical device, such as on a network share, where the ASV is accessed over a network, the same performance issues can arise when delivering applications from the ASV to the physical device as in the VDI setting, and particularly in the cloud-based VDI setting. To address these issues, the ASV applications can be pre-cached on the physical device by caching blocks of the applications used during launch in the cache of the physical device before the applications are launched by the user in a similar way as described above in the VDI setting. In this case, once the user signs into his or her session on the physical device, the ASV agent would begin the process of pre-caching the applications in the ASV using the techniques described above.

Figure 6:
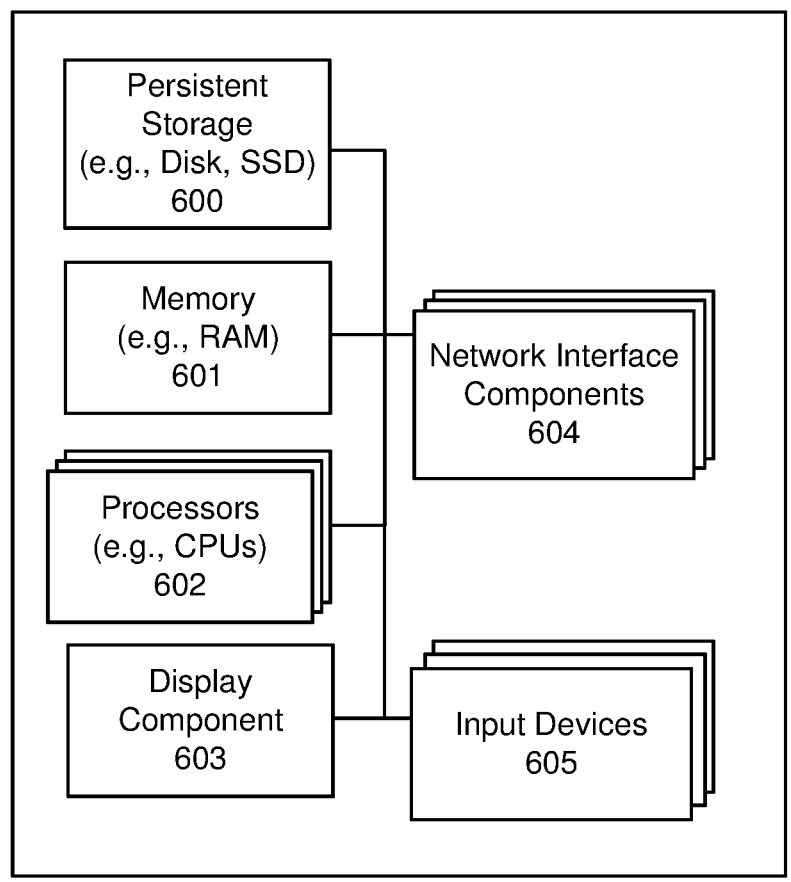
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for delivering an application contained in an application storage volume (ASV) residing on a storage device to a virtual machine (VM) hosted on a server, comprising:
   by an agent executing on the VM, mounting the ASV on the VM to make the application executable in the VM from the ASV;
   reading a manifest in the ASV to identify a set of data blocks that are likely to be accessed during application launch, wherein the manifest is generated during an application capture process of the ASV;
   prior to receiving a request to launch the application, pre-fetching the set of data blocks of the application identified in the manifest by the agent and storing the set of data blocks into a cache associated with the VM;
   receiving a request to launch the application on the VM; and
   launching the application on the VM from the ASV by accessing the retrieved pre-fetched data blocks in the cache associated with the VM.

2. The method of claim 1, wherein generating the manifest during the application capture process further comprises:
   intercepting file and registry operations made during installation of the application on a staging virtual machine and redirecting the file and registry operations to the ASV;
   upon completion of the installation, launching the application on the staging virtual machine; and
   monitoring read operations made during the launching of the application to identify the set of data blocks that are likely to be accessed during the application launch.

3. The method of claim 2, wherein generating the manifest further comprises:
   launching the application on the staging virtual machine in a hidden session, wherein user interface operations of the application launch are invisible to a user in the hidden session.

4. The method of claim 2, wherein the identified set of data blocks that are likely to be accessed during the application launch are rearranged on the ASV to be placed sequentially in the order that the identified data blocks are accessed by the application during the launching of the application on the staging virtual machine.

5. The method of claim 1, wherein the ASV contains a plurality of applications, and wherein the ASV agent pre-fetches data blocks used during launch of each of the plurality of applications in a specified order, wherein the specified order is based on a prediction of an order in which a user of the VM will launch the plurality of applications.

6. The method of claim 5, wherein the prediction of the order in which the user of the VM will launch the plurality of applications is determined based on observations of orders in which the user of the VM has launched the plurality of applications on the VM in the past.

7. The method of claim 1, wherein the ASV is located on a network share and is accessed remotely by the VM.

8. A computing device for delivering an application contained in an application storage volume (ASV) residing on a storage device to the computing device, comprising:
   at least one processor; and
   memory including instructions that, when executed by the at least one processor, cause the computing device to perform the steps of:

by an agent executing on the computing device, mounting the ASV on the computing device to make the application executable in the computing device from the ASV;

reading a manifest in the ASV to identify a set of data blocks that are likely to be accessed during application launch, wherein the manifest is generated during an application capture process of the ASV;

prior to receiving a request to launch the application, pre-fetching the set of data blocks of the application identified in the manifest by the agent and storing the set of data blocks into a cache associated with the computing device;

receiving a request to launch the application on the computing device; and launching the application on the computing device from the ASV by accessing the retrieved pre-fetched data blocks in the cache associated with the computing device.

9. The computing device of claim 8, wherein generating the manifest during the application capture process further comprises:

intercepting file and registry operations made during installation of the application on a staging virtual machine and redirecting the file and registry operations to the ASV;

upon completion of the installation, launching the application on the staging virtual machine; and monitoring read operations made during the launching of the application to identify the set of data blocks that are likely to be accessed during the application launch.

10. The computing device of claim 9, wherein generating the manifest further comprises:

launching the application on the staging virtual machine in a hidden session, wherein user interface operations of the application launch are invisible to a user in the hidden session.

11. The computing device of claim 9, wherein the identified set of data blocks that are likely to be accessed during the application launch are rearranged on the ASV to be placed sequentially in the order that the identified data blocks are accessed by the application during the launching of the application on the staging virtual machine.

12. The computing device of claim 8, wherein the ASV contains a plurality of applications, and wherein the ASV agent pre-fetches data blocks used during launch of each of the plurality of applications in a specified order, wherein the specified order is based on a prediction of an order in which a user of the computing device will launch the plurality of applications.

13. The computing device of claim 12, wherein the prediction of the order in which the user of the computing device will launch the plurality of applications is determined based on observations of orders in which the user of the computing device has launched the plurality of applications on the computing device in the past.

14. The computing device of claim 8, wherein the ASV is located on a network share and is accessed remotely by the computing device.

15. A non-transitory computer readable storage medium for delivering an application contained in an application storage volume (ASV) residing on a storage device to a virtual machine (VM) hosted on a server, comprising one or more sequences of instructions, the instructions when executed by one or more processors causing the one or more processors to execute the operations of:

by an agent executing on the VM, mounting the ASV on the VM to make the application executable in the VM from the ASV;

reading a manifest in the ASV to identify a set of data blocks that are likely to be accessed during application launch, wherein the manifest is generated during an application capture process of the ASV;

prior to receiving a request to launch the application, pre-fetching the set of data blocks of the application identified in the manifest by the agent and storing the set of data blocks into a cache of associated with VM;

receiving a request to launch the application on the VM; and launching the application on the VM from the ASV by accessing the retrieved pre-fetched data blocks in the cache associated with the VM.

16. The non-transitory computer readable storage medium of claim 15, wherein generating the manifest during the application capture process further comprises:

intercepting file and registry operations made during installation of the application on a staging virtual machine and redirecting the file and registry operations to the ASV;

upon completion of the installation, launching the application on the staging virtual machine; and monitoring read operations made during the launching of the application to identify the set of data blocks that are likely to be accessed during the application launch.

17. The non-transitory computer readable storage medium of claim 16, wherein generating the manifest further comprises:

launching the application on the staging virtual machine in a hidden session, wherein user interface operations of the application launch are invisible to a user in the hidden session.

18. The non-transitory computer readable storage medium of claim 16, wherein the identified set of data blocks that are likely to be accessed during the application launch are rearranged on the ASV to be placed sequentially in the order that the identified data blocks are accessed by the application during the launching of the application on the staging virtual machine.

19. The non-transitory computer readable storage medium of claim 15, wherein the ASV contains a plurality of applications, and wherein the ASV agent pre-fetches data blocks used during launch of each of the plurality of applications in a specified order, wherein the specified order is based on a prediction of an order in which a user of the VM will launch the plurality of applications.

20. The non-transitory computer readable storage medium of claim 19, wherein the prediction of the order in which the user of the VM will launch the plurality of applications is determined based on observations of orders in which the user of the VM has launched the plurality of applications on the VM in the past.

* * * * *